Dec. 18, 1934.　　　　N. C. WARD　　　　1,984,854
ARTICLE OF MANUFACTURE
Filed July 11, 1932
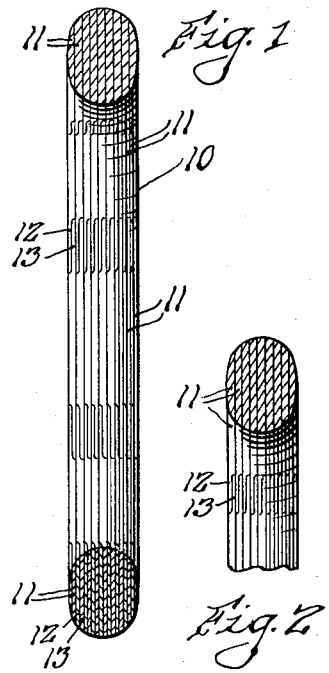
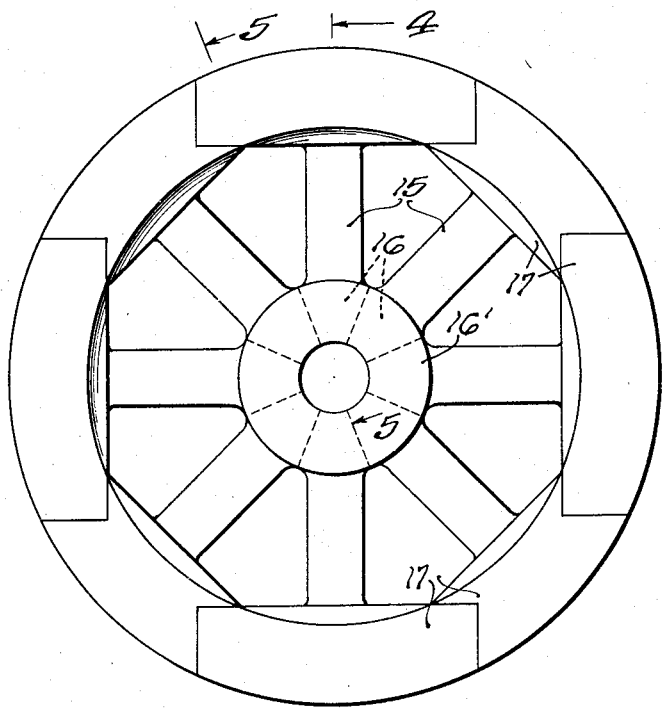
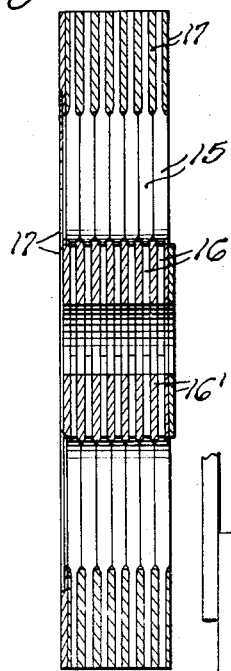
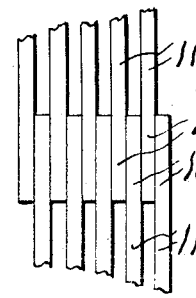
Inventor:
Neil C. Ward Patented Dec. 18, 1934

1,984,854

UNITED STATES PATENT OFFICE 1,984,854

ARTICLE OF MANUFACTURE

Neil C. Ward, Chicago, Ill., assignor to Anderson-Tully Company, Memphis, Tenn., a corporation of Michigan Application July 11, 1932, Serial No. 621,902

5 Claims. (Cl. 20—91)

The present invention relates to articles of manufacture and has particularly to do with an unique process for their production.

One of the difficulties connected with the fabrication of articles from wood and the like has been the obtaining of sufficient strength in the parts subject to strain. This has been particularly true of articles the manufacture of which has been attempted with soft wood. Metal and other reinforcings have been supplied. These make the assembly a difficult task and make necessary a close interfitting of wood and metal parts. There has been a demand for better methods of fabrication of wooden articles and the like, and particularly from cheaper woods and smaller blocks, and in which, during a course of manufacture, the parts requiring strength are adequately reinforced in keeping with the strains to which the parts are to be subjected.

The present invention has for its objects, among others, the following:

New and improved means for fabricating wooden and similar articles.

An improved method of producing articles of wood or the like in which different strengths are required over various sections.

An improved means for the production of articles of manufacture and in which the quantity and character of materials are arranged in accordance with the demands made thereupon in service.

An unique article of manufacture.

These objects, and such other objects as may hereinafter appear, are obtained by the novel construction, unique arrangement, improved combination, and advanced process hereinafter described as relating to two articles of manufacture, said articles of manufacture being illustrated in the accompanying drawing, in which:

Figure 1 is an irregular section through a ring member made in accordance with the present invention;

Figure 2 is a transverse section therethrough;

Figure 3 is a plan view of a second article of manufacture in which the invention may be employed;

Figure 4 is a diametrical section through the article illustrated in Figure 3;

Figure 5 is a section on the line 5—5 of Figure 3;

Figure 6 shows a portion of the device before it is compressed into final form; and Figure 7 indicates the manner in which the strips employed in Figure 3 overlap.

Like reference characters are used to designate similar parts in the drawing and in the description which follows.

In the Southern States of the United States and elsewhere throughout the world, there are many trees the wood of which is too soft for most manufacturing purposes. Now that the supplies of hardwood are decreasing, and its cost is mounting, it has become necessary to provide special means and methods and processes whereby substitutes for hardwoods are obtained.

In a number of instances, hardwoods have not proved satisfactory for the strains to which the articles made therefrom have been subjected, and the present method and process not only provides means for using effectively soft woods heretofore considered impracticable for most purposes, but also supplies a method whereby hard woods may be strengthened or fortified.

The present invention also illustrates and describes a method whereby articles heretofore directly produced from sizable blocks of wood may be readily fabricated from much smaller sections of material.

Figures 1 and 2 illustrate the ring portion of a steering wheel suitable for automobiles, motor boats, and other purposes. The ring 10 comprises a plurality of strips 11 of wood such as heart or sap which are laid with overlapping ends 12 and 13. For example, a plurality of strips 11 of uniform length and suitable cross sections may be laid with their ends 12 and 13 overlapping, the opposed ends of each member 11 lying in overlapping or overlapped relations, or both, in respect to adjacent similar strips 11. The strips 11 in fabricating a wheel may be laid in a substantially circular arrangement preparatory to applying pressure thereto. The manner in which the strips 11 are arranged with their ends 12 and 13 overlapping prior to their being compressed is shown in Figure 6.

Preliminary to applying pressure to said strips so arranged, it is usual to apply an adhesive, which may be of the casein type. When the selected or desired number of strips 11 are laid in the manner described, and generally over a matrix or form, the assembled strips are placed in a press and pressure applied thereto. Heat may also be applied if the glue is of a type which will first soften and thereafter harden under pressure and (or) heat.

A uniform pressure is applied to the assembled strips. The overlapping ends 12 and 13 of the strips 11 naturally form a mass of matter of greater thickness than the non-overlapping sections. Under the pressure applied, the overlapping sections 12 and 13 are reduced to the same cross section as the non-overlapping sections. A rough member of uniform thickness and of uniform cross section is thus obtained.

By a process of finishing, like that applied to a hardwood, the composite member is further shaped, smoothed and made regular in its form. The pressure is such that no crevices or cracks remain between overlapping sections 12 and 13, and the whole of the assembled strips are converted into a substantially solid or homogeneous body.

In a steering wheel, substantially uniform strength is required about its entire circumference.

The device which has been produced by the method described is of greater strength in the overlapping sections than elsewhere. The overlapping portions may be so arranged that these form the anchoring sections for the spokes which form the spider of a steering wheel.

If it is desired to manufacture an automobile wheel of the artillery type or other wheels, the various members used in the assembly will not be identical as may be the case in the fabrication of a steering wheel. Instead, there may be members 15 which are used for forming the spokes, angular or disk-like members 16 which assist in the forming of the hub, and other members 17 for forming the rim. The hub requires great strength, as does also the rim. The spokes may be graduated in mass and strength away from the hub toward the rim or felly. Thus, as is shown in Figures 3, 4 and 5, an artillery wheel may be produced by fabrication, there being used spoke-forming members 15 which are laid radially. The ends of the spoke forming members are shaped by tapering the sides to allow of radial arrangement. Intermediate adjacent layers of the spoke forming parts 15 and to assist in forming the hub, are circular disks 16, such members generally being laid intermediate each lamination of the spoke forming members 15.

The members 17 forming the periphery of the wheel should be of a length adapted to extend adjacent one spoke over the second spoke and almost to a third spoke. Members 17 are laid with overlapping ends as shown by the dotted lines 18 in Figure 7. In addition, the strips 15 which form the spokes are laid alternately therebetween. The spoke forming members 15 preferably fall intermediate the overlapping ends of the felly forming parts 17.

When the parts, with the proper sections thereof coated with a suitable glue, are assembled in a mandrel or matrix, or the like, the whole assembly is placed in a press and pressure applied.

The materials may be heated while they are in the press. Such heat softens the wood rendering it pliable. Uniform pressure is applied throughout. The parts having the greatest thickness are compressed more thoroughly than those of less thickness, with the result that a stronger periphery and stronger hub may be obtained.

After sufficient pressure has been applied to the assembly and the adhesive has taken effect, the assembly is removed from the press, and dressed to provide a finished wheel, as is illustrated in the figures above. By the compression of the strips, such strips are made to fit so snugly and closely one to another that they appear to be a single unit. There are no unfilled interstices between strips whether alined, angular or opposed one with another.

Other devices may be similarly formed, i. e., by thickening the laminations where strength is required.

By using a casein glue and particularly a casein glue of a modified type, i. e., one from which the silicate is omitted, it is possible first to apply the adhesive to the veneer or wood sheet, allow the adhesive to dry, and then assemble the sheets with the dry glue thereon. The heat of compression and added heat employed during the pressing operation (if any) causes the dry glue first to soften, and immediately thereafter to harden and become "set".

When and if desired, veneer sheets as produced may be treated with adhesive before being sized or cut to provide members for assembly. Thus, the adhesive may be more cheaply applied than when it is spread upon individually cut or previously sized members. The veneer sheets, after the adhesive spread thereover has dried, may be cut and sized as and when required.

There is another advantage in using glue that is allowed to dry anterior to the assembly of the members forming the article. When the glue is applied and allowed to dry, there is no muss or gumming during the process, for in assembly and compression dry materials only are handled. In the press, there is no squeezing from between adjacent sheets of veneer an excess of wet and sticky glue. A smooth face is obtained from coated dry veneers where two sheets overlap with their edges in parallelism, the glue not running out and caking as it would if wet. The production of such smooth edges eliminates or reduces to a minimum the expense of finishing a fabricated article produced by the process herein described for the operation of removing excess glue is eliminated.

What is claimed as new and is desired to be secured by Letters Patent of the United States is:

1. A fabricated article of manufacture of a laminated compressible material, sections of which comprise units, the said units having sections overlapping sections of other units of greater strength and more dense than the remainder of the units, but of the same dimensions as the remainder of the units.

2. As a new article of manufacture, an article formed from a plurality of strips of compressible material, certain of said strips having overlapping sections, the sections where the strips overlap being of a thickness not greater than an adjacent portion of said object in which the strips are not overlapping, and being of greater density than said adjacent portions.

3. A new article of manufacture comprising a plurality of strips of compressible material laid with their ends overlapped by portions of other strips, the whole being of a definite form in which the overlapping sections are of dimensions not greater than the adjacent non-overlapping sections, and in which the overlapping sections are of greater density than the adjacent non-overlapping sections.

4. A new article of manufacture of laminated compressible material, sections of which form units, the points where such units join consisting of alternately overlapping laminations of the material of the joined units, the said points of joining being of greater density and strength than other points but of no greater dimensions than the non-overlapped sections of the units.

5. An article of manufacture comprising a plurality of preformed compressible wooden strips, certain of said strips having portions thereof overlapping portions of other strips, and the whole being of predetermined thickness, the overlapping portions being more dense and of greater strength than non-overlapping portions of said strips.

NEIL C. WARD.